(12) United States Patent
Jeong et al.

(10) Patent No.: US 10,437,349 B2
(45) Date of Patent: Oct. 8, 2019

(54) DISPLAY DEVICE FOR INTERFACING BY USING SMALLER NUMBER OF BUTTONS OF KEY PAD AND DISPLAY METHOD FOR THE SAME

(71) Applicant: Samsung Electronics Co., Ltd., Suwon-si (KR)

(72) Inventors: Seong Wook Jeong, Seoul (KR); Hyo Seung Park, Seoul (KR); Kyung Jin Kim, Seoul (KR); Min Hyung Kim, Seoul (KR); Ga Min Park, Seoul (KR); So Yon You, Seoul (KR); Sang Joon Lee, Dangjin-si (KR); Jun Woo Lee, Seoul (KR); Kyung Hwa Jung, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 15/827,610

(22) Filed: Nov. 30, 2017

(65) Prior Publication Data

US 2018/0157339 A1 Jun. 7, 2018

(30) Foreign Application Priority Data

Dec. 1, 2016 (KR) ........................ 10-2016-0163041

(51) Int. Cl.
*G06F 3/023* (2006.01)
*H04N 21/422* (2011.01)
(Continued)

(52) U.S. Cl.
CPC .......... *G06F 3/0236* (2013.01); *G06F 3/0234* (2013.01); *H04N 5/4403* (2013.01);
(Continued)

(58) Field of Classification Search
None
See application file for complete search history.

(56) References Cited

U.S. PATENT DOCUMENTS

| 2003/0005445 A1* | 1/2003 | Schein | H04N 5/44543 725/51 |
| 2004/0143816 A1* | 7/2004 | Matsubayashi | H04N 5/44543 717/114 |

(Continued)

FOREIGN PATENT DOCUMENTS

| KR | 10-2007-0010557 | 1/2007 |
| KR | 10-2009-0036819 | 4/2009 |

*Primary Examiner* — Joseph R Haley
*Assistant Examiner* — Emily J Frank
(74) *Attorney, Agent, or Firm* — Staas & Halsey LLP

(57) ABSTRACT

A display device includes a display; a communication device which communicates with a remote controller that includes a first button group having at least one button, and a second button group having at least one other button. A processor highlights and displays at least two key objects on the keypad from among a plurality of key objects arranged in a plurality of rows and a plurality of columns, upon receiving a first control signal according to manipulation of the at least one button of the first button group from the remote controller, and recognizes, as an input key, one key object, which corresponds to a second control signal according to manipulation of the at least one other button of the second button group, among the at least two key objects, upon receiving the second control signal from the remote controller.

18 Claims, 10 Drawing Sheets

(51) Int. Cl.
*H04N 5/44* (2011.01)
*H04N 21/41* (2011.01)

(52) U.S. Cl.
CPC ... *H04N 21/42204* (2013.01); *H04N 21/4104* (2013.01); *H04N 2005/4416* (2013.01); *H04N 2005/4442* (2013.01)

(56) References Cited

U.S. PATENT DOCUMENTS

2013/0047238 A1* 2/2013 Hwang ................. H04L 9/3228 726/7
2016/0026319 A1* 1/2016 Zhang .................. G06F 3/0488 345/173
2016/0092103 A1* 3/2016 Braden, V ............ G06F 3/0236 715/773

* cited by examiner

| 1 | 2 | 5 | 9 | 6 |
|---|---|---|---|---|
| 3 | 4 | 7 | 0 | 8 |

FIG.5A

| 1 | 2 |
|---|---|
| 3 | 4 |
| 5 | 6 |
| 7 | 8 |
| 9 | 0 |

FIG.5B

|   |   |   |
|---|---|---|
| 1 | 2 | 5 |
| 3 | 4 | 7 |
| 5 | 8 | 9 |
| 3 | 0 | 1 |

FIG.5C

|   |   |   |   |
|---|---|---|---|
| 1 | 2 | 7 | 8 |
| 3 | 4 | 1 | 0 |
| 5 | 6 | 9 | 4 |

FIG.5D

DISPLAY DEVICE FOR INTERFACING BY USING SMALLER NUMBER OF BUTTONS OF KEY PAD AND DISPLAY METHOD FOR THE SAME

CROSS-REFERENCE TO RELATED APPLICATION(S)

This application claims the benefit under 35 U.S.C. § 119(a) of a Korean patent application filed on Dec. 1, 2016 in the Korean Intellectual Property Office and assigned Serial number 10-2016-0163041, the entire disclosure of which is hereby incorporated by reference.

TECHNICAL FIELD

The present disclosure relates to a display device for interfacing by using a smaller number of buttons of a keypad and a display method for the same.

BACKGROUND

A shared-type display device, such as a television (TV) may be weak in security since a plurality of users view one screen. Therefore, a conventional shared-type display device may employ an interface for enhancing security for input information. For example, if a password is input, the conventional shared-type display device may change the input password to a special character within a few seconds. However, such an interfacing manner may leak the password through the screen.

SUMMARY

Recently, since a remote controller shows a growing tendency toward a smaller number of buttons as the remote controller is provided in a compact size, a keypad easy to provide a user interface is required.

Aspects of the present disclosure are to address at least the above-mentioned problems and/or disadvantages and to provide at least the advantages described below. Accordingly, an aspect of the present disclosure is to provide a display device for interfacing by using a smaller number of buttons of a keypad.

In accordance with an aspect of the present disclosure, a display device includes a display; a communication device which communicates with a remote controller, in which the remote controller includes a first button group that includes at least one button, and a second button group includes at least one another button different from the at least one button of the first button group; and a processor which outputs information representative of a keypad on the display. The keypad includes a plurality of key objects arranged in a plurality of rows and a plurality of columns. The processor receives a signal from the remote controller through the communication device, highlights and displays at least two key objects on the keypad, upon receiving a first control signal according to manipulation of the at least one button of the first button group from the remote controller, and recognizes, as an input key, one key object, which corresponds to a second control signal according to manipulation of the at least one other button of the second button group, among the at least two key objects, if receiving the second control signal from the remote controller.

In accordance with another aspect of the present disclosure, a display method of a display device communicating with a remote controller, in which the remote controller includes a first button group and a second button group, the first button group includes at least one button, and the second button group includes at least one another button, includes displaying key objects of a keypad, which are formed in a plurality of rows and a plurality of columns on a display; receiving a first control signal according to manipulation of the at least one button of the first button group when the remote controller transmits the first control signal; highlighting and displaying at least two key objects corresponding to the first control signal among the plurality of key objects of the keypad; receiving a second control signal according to manipulation of the at least one other button when the remote controller transmits the second control signal; and recognizing, as an input key, one key object, which corresponds to the second control signal, among the at least two key objects.

In accordance with another aspect of the present disclosure, a non-transitory computer-readable storage medium has a program for executing a method including, if a remote controller, which includes a first button group including at least one button and a second button group including at least one another button different from the at least one button of the first button group, transmits a first control signal according to manipulation of the at least one button, receiving the first control signal; highlighting and displaying at least two key objects corresponding to the first control signal among key objects of a keypad, which are formed in a plurality of rows and a plurality of rows; receiving a second control signal according to manipulation of the at least one other button when the remote controller transmits the second control signal; and recognizing, as an input key, one key object corresponding to the second control signal among the at least two key objects.

According to the embodiments disclosed in the present disclosure, a keypad interface, which is able to be manipulated by the manipulation of a smaller number of buttons, may be provided. Besides, various effects, which are directly or indirectly produced through the present disclosure, may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5A is a view illustrating a keypad including a key object arranged in a 2×5 matrix, according to an embodiment;

FIG. 5B is a view illustrating a keypad including a key object arranged in a 5×2 matrix, according to an embodiment;

FIG. 5C is a view illustrating a keypad including a key object arranged in a 3×4 matrix, according to an embodiment;

FIG. 5D is a view illustrating a keypad including a key object arranged in a 4×3 matrix, according to an embodiment.

Throughout the drawings, it should be noted that like reference numbers are used to depict the same or similar elements, features, and structures.

DETAILED DESCRIPTION

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present there between.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device FIG. 1 is a view illustrating a display system, according to an embodiment.

Figure 1:
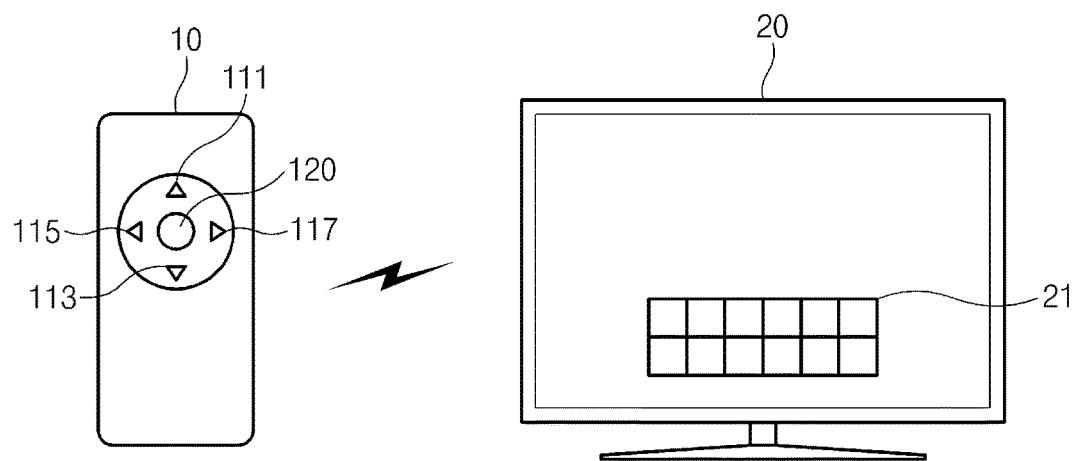
FIG. 1 is a view illustrating a display system, according to an embodiment.

Referring to FIG. 1, according to an embodiment, a display system 12 may include a remote controller 10 and a display device 20.

According to an embodiment, the remote controller 10 may receive a user input and may transmit a control signal corresponding to the user input to the display device 20. For example, the remote controller 10 may communicate with the display device 20 through a short range wireless communication scheme such as Bluetooth, near field communication (NFC), or infrared (IR) communication.

According to an embodiment, the remote controller 10 may include a first button group including at least one button manipulated by a user and a second button group including at least one different button. The first button group may include a first button allocated to a moving function in a first direction and a second button allocated to a moving function in a second direction opposite to the first direction. The second button group may include a third button allocated to a moving function in a third direction perpendicular to the first and second directions and a fourth button allocated to a moving function in a fourth direction opposite to the third direction.

For example, if the first button group includes a first button 111 (up button) allocated to the moving function in the up direction, a second button 113 (down button) allocated to a moving function in a down direction, the second button group may include a third button 115 (left button) allocated to a moving function in a left direction and a fourth button 117 (right button) allocated to a moving function in a right direction.

For example, if the first button group includes the left button 115 allocated to the moving function in the left direction and the right button 117 allocated to the moving function in the right direction, the second button group may include the up button 111 allocated to the moving function in the up direction and the down button 113 allocated to the moving function in the down direction. The first button group and the second button group may be arranged such that the first button group and the second button group are connected together. A first area between the up button 111 and the down button 113 and a second area between the left button 115 and the right button 117 may be at least partially overlapped with each other. The second button may include a seventh button 120 ("OK" button; confirm button). The "OK" button 120 may be positioned in an area between the first button group and the second button group and may be a button allocated to, for example, a confirm function. As described above, the first button group and the second button group may include buttons allocated to specific functions according a basic instruction stored in the remote controller 10.

According to an embodiment, the display device 20 may include at least one of a television (TV), a monitor, a notebook computer, a large format display (LFD), a smartphone, a tablet personal computer (tablet PC), a mobile phone, a video phone, an e-book reader, a desktop PC, a laptop PC, a netbook computer, a personal digital assistant (PDA), a portable multimedia player (PMP), an MP3 player, a camera, or a wearable device.

The display device 20 may perform a function corresponding to a control signal from the remote controller 10. According to an embodiment, the display device 20 may perform a function of requiring a key input corresponding to the control signal from the remote controller 10. When the display device 20 performs the function of requiring the key input, the display device 20 may display a keypad 21 including a plurality of key objects. For example, the function of requiring the key input may be a function of setting a password. According to an embodiment, if the display device 20 recognizes a first control signal according to the manipulation of one button included in the first button group, the display device 20 may highlight and display at least two key objects of the keypad 21. According to an embodiment, if the display device 20 recognizes a second control signal according to the manipulation of a button included in the second button group, the display device 20 may recognize, as an input key, one key object, which corresponds to the second control signal, among at least two key objects. According to an embodiment, the display device 20 may display a first object corresponding to the input key on a screen if the input key is recognized. The first object may be a specified key object (e.g., a special character) different from the input key. For example, the display device 20 may expose one special character such that a user recognizes the input of one key, without directly exposing the input key onto a screen. Therefore, an embodiment may provide an interface allowing the user to recognize the input of the key in the state that the input key is not exposed on the screen, and thus the share-type display device may have an advantage when performing a key input function, such as a password input function, requiring security.

Hereinafter, the relationship between the keypad 21 of the display device 20 and the first and second button groups of the remote controller 10 will be described.

According to an embodiment, the button included in the first button group of the remote controller 10 may be manipulated by the user to select input candidate objects highlighted and displayed on the keypad 21. The button included in the first button group may be allocated to a moving function in the arrangement direction (row direction or column direction) of a row or a column representing a longer length among rows and columns of the keypad 21. According to an embodiment, the button included in the second button group of the remote controller 10 may be manipulated by the user to select one key among the input candidate objects. The second button group may be allocated to the moving function in the arrangement direction of a row or a column representing a shorter length among the rows and the columns of the keypad 21.

For example, as illustrate in FIG. 1, in the case that a row length of the keypad 21 is longer than a column length of the keypad 21, the first button group may include the left button 115 and the right button 117 and the second button group may include the up button 111 and the down button 113. For another example, in the case that the column length of the keypad 21 is longer than the row length of the keypad 21, the first button group may include the up button 111 and the down button 113 and the second button group may include the left button 115 and the right button 117. Therefore, according to an embodiment, even if a smaller number of buttons are provided in the remote controller 10, various key input functions may be provided.

Figure 2:
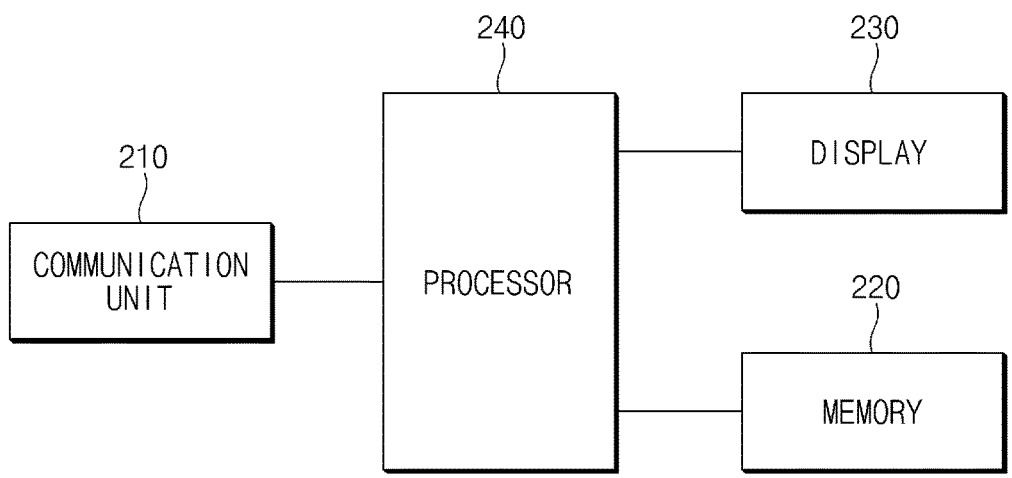
FIG. 2 is a block diagram illustrating a display device, according to an embodiment.

FIG. 2 is a block diagram illustrating the display device, according to an embodiment.

Referring to FIG. 2, according to an embodiment, the display device 20 may include a communication unit 210, a memory 220, a display 230, and a processor 240. According to an embodiment, some elements may be omitted, and additional elements may be included. Some elements may be coupled to each other and formed in one entity. In this case, the coupled elements may identically perform the functions before the coupling.

The communication unit 210 may communicate with the remote controller 10 by using at least one communication scheme. The communication scheme may be various short range wireless communication schemes such as Bluetooth, NFC, and IR. According to an embodiment, if a user manipulates one of the buttons of the remote controller 10, the remote controller 10 may transmit a control signal corresponding to the manipulated button. The communication unit 210 may transform the control signal from the remote controller 10 into the form that is able to be analyzed by the processor 240 and may output the control signal. For example, if receiving a control signal corresponding to the first button group as one button included in the first button group is manipulated, the communication unit 210 may output the first control signal transformed into the form that is able to be analyzed by the processor 240. For example, if receiving a control signal corresponding to the second button group as one button included in the second button group is manipulated, the communication unit 210 may output the second control signal transformed into the form that is able to be analyzed by the processor 240. Since each of the first button group and the second button group includes a plurality of buttons, the first control signal and the second control signal may be slightly different signals including codes corresponding to the buttons that are actually manipulated. However, in the following description, for the convenience of explanation, a control signal according to the manipulation of one button included in the first button group for highlighting and displaying the key objects is referred to as the first control signal. In addition, a control signal according to the manipulation of a button included in the second button group for selecting, as an input, one of the highlighted and displayed key objects is referred to as the second control signal.

The memory 220 may be a volatile memory (e.g., a random access memory (RAM), or the like), a non-volatile memory (e.g., a read-only memory (ROM), a flash memory, or the like), or the combination thereof. The memory 220 may store an instruction or data related to at least one of remaining elements of the display device 20. For example, the memory 220 may store control information necessary for analyzing each control signal from the remote controller 10, an instruction necessary for performing a function corresponding to the control signal, and an image (e.g., a keypad, a key object, or the like) necessary for outputting a screen corresponding to each function. The memory 220 may store an input key corresponding to the key object included on the keypad 21.

For example, the display 230 may include, for example, at least one of a liquid crystal display (LCD), a light emitting diode (LED) display, an organic LED (OLED) display, a micro electro mechanical systems (MEMS) display, or an electronic paper display. The display 230 may display, for example, various contents (e.g., a text, an image, a video, an icon, a symbol, and/or the like) to a user. The display 230 may include a touch screen and may receive, for example, a touch, gesture, proximity, or hovering input using an electronic pen or a part of a user's body. According to an embodiment, the display 230 may display the keypad 21 according to the instruction of the processor 240. The keypad 21 will be described together with the processor 240 later.

For example, the processor 240 may include, for example, at least one of a central processing unit (CPU), a graphics processing unit (GPU), a micro-processor, application specific integrated circuits (ASICs), or a field programmable gate array (FPGA), or may have a plurality of cores. According to an embodiment, the processor 240 may display a first screen including the keypad 21 including a plurality of key objects on the display 230 (see FIGS. 3A to 3C). The first screen will be described with reference to FIGS. 3A to 3C. The function may be, for example, a function for inputting a password. The keypad 21 may display a plurality of key objects in the form of a plurality of rows or a plurality of columns. The key object may include at least one of a numeric key object, a character key object, a sign key object, a blank key object, or a functional key object. At least one of the numeric key object, the character key object, the sign key object, the blank key object, or the functional key object may be repeatedly displayed. At least one of the numeric key object, the character key object, the sign key object, the blank key object, or the functional key object may be arranged according to a specified rule or randomly. The arrangement of the key object according to the specified rule may allow a user to easily identify the key object, and the random arrangement of the key object may reduce the leakage possibility of the input key. The functional key object may include a key object allocated to a function, such as erasing, initializing, or viewing, of correcting or confirming an input. The functional key object may include a key object allocated to a function of rearranging the keypad 21. Since the functional key object is a key that does not require security, the functional key objects may be arranged according to the specified rule.

According to an embodiment, the processor 240 may highlight and display at least two key objects on the keypad 21 when displaying the first screen. For example, the processor 240 may highlight and display key objects included in one row or one column of the keypad 21. The row or column of the keypad 21, which is highlighted and displayed, may be a row or column representing a shorter length among the rows and the columns of the keypad 21. According to an embodiment, the processor 240 may highlight and display input candidate objects set in default or selected. The input candidate objects set in default may be keys stored in the memory 220. In detail, the input candidate objects may be included in the first row or the first column of the keypad 21. The selected input candidate objects may be objects selected corresponding to the first control signal received through the communication unit 210 according to the manipulation of one button included in the first button group of the remote controller 10. For example, the processor 240 may highlight and display the input candidate objects set in default on the keypad 21 when exposing the first screen before receiving the first control signal. If the processor 240 recognizes the first control signal while highlighting and displaying the input candidate objects, the processor 240 may change and display the input candidate objects highlighted and displayed on the keypad 21 corresponding to the first control signal.

According to an embodiment, the processor 240 may highlight and display at least two key objects (or input candidate objects) in various forms. According to the first embodiment, the processor 240 may highlight and display the input candidate objects as the processor 240 increases the sizes of the input candidate objects while displaying shape images, which correspond to the first and second button groups of the remote controller 10, at a lower end of the input candidate objects (thereafter, see FIG. 3A). According to the second embodiment, the processor 240 may display the input candidate objects in the size larger than sizes of other key objects. According to the third embodiment, the input candidate objects may be displayed in color distinguished from colors of other key objects. According to the fourth embodiment, the processor 240 may display the input candidate objects with thickness thicker than those of other key objects. According to the fifth embodiment, the processor 240 may display thick edges, which surround the input candidate objects, with thickness thicker than edges surrounding other key objects. According to the sixth embodiment, background color is applied to the input candidate objects and then the input candidate objects may be displayed. In addition, the input candidate objects may be highlighted in various forms. The processor 240 may enlarge and display the input candidate objects in shape corresponding to the first and second button groups of the remote controller 10.

According to an embodiment, if the processor 240 recognizes the second control signal while highlighting and displaying the input candidate objects on the keypad 21, the processor 240 may recognize, as an input key, one key object, which corresponds to the second control signal, among the highlighted input candidate objects. As described above, since the second button group includes a plurality of buttons in the remote controller 10, the second control signal may include various codes depending on the types of the buttons manipulated among the buttons included in the second button group. Therefore, as the processor 240 identifies a code included in the second control signal, the processor 240 may determine a key object, which is selected among the highlighted and displayed input candidate objects, as a key input. According to an embodiment, if the processor 240 recognizes the input key, the processor 240 may display the first object, which corresponds to the input key, on the first screen such that a user recognizes the input key. The first object may be an object including information identical to information (e.g., a character or a number) included in the key object recognized as the input key or may be a specified object (e.g., a special character) different from the input key. For example, if the input key is "1", the processor 240 may display "1", which serves as the first object, on the first screen or may display "*" as the first object instead of "1".

According to an embodiment, if the processor 240 determines that at least one of the numeric key object, the character key object, or the sign key object is selected based on the second control signal, the processor 240 may recognize the selected key object as the input key. If the processor 240 determines that the blank key object is selected from the second control signal, the processor 240 may ignore the blank key object without recognizing the blank key object as the key input. If the processor 240 determines that an erasing key object allocated to an erasing function is selected based on the second control signal, the processor 240 may cancel the key input which is previously input. If the processor 240 determines that a key object allocated to an initializing function is selected based on the second control signal, the processor 240 may cancel all key inputs which are previously input. If the processor 240 determines that a key object allocated to a viewing function is selected based on the second control signal, the processor 240 may view keys which are input. For example, the processor 240 may view the input keys in the unit of some keys without viewing the input keys in a batch for the security purpose. In this case, the processor 240 may view the input keys randomly instead of a specified sequence. To this end, the processor 240 may store all input keys in the memory 220. If the processor 240 determines that a key object allocated to a rearranging function is selected based on the second control signal, the processor 240 may rearrange key objects included in the keypad 21.

According to an embodiment, the processor 240 may display the input keys and the total number of the input keys on the first screen while distinguishing between the input keys and the total number of the input keys. For example, the processor 240 may display blocks, which are linked to each other, by the total number of the input keys, separately from the keypad 21 on the first screen, and may display the first object in the block, thereby displaying the input keys. Therefore, according to an embodiment, the input keys (e.g., a password) are not directly exposed onto the first screen, but only alternate characters representing that keys are input may be exposed on the first screen, thereby preventing the input keys from being leaking through the display screen in the key input procedure requiring the security.

FIGS. 3A to 3D are views illustrating a first screen including the keypad, according to an embodiment.

Figure 3A:
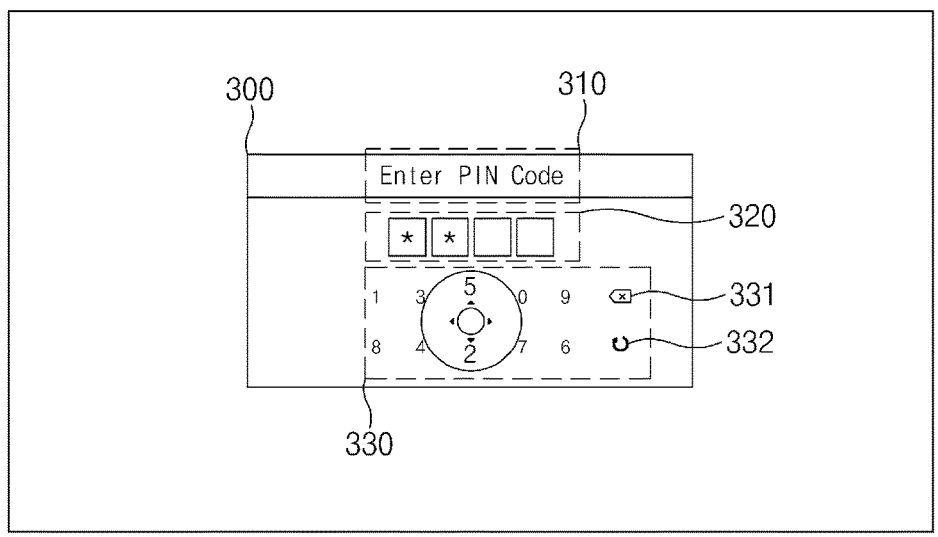
FIGS. 3A, 3B, 3C and 3D are views illustrating a first screen including a keypad, according to an embodiment.

Referring to FIG. 3A, according to an embodiment, a first screen 300 may include a title field 310, an input confirmation field 320, and a keypad 330. The first screen 300 illustrated in FIG. 3A is provided for the illustrative purpose, but the present invention is not limited thereto.

According to an embodiment, the summary, the function, or the objective of the first screen 300 may be displayed on the title field 310. For example, in the case that the first screen 300 is an interface screen for inputting a password (a personal identify number; PIN), the summary, such as "Enter PIN code", of the first screen 300 may be displayed.

Figure 3B:
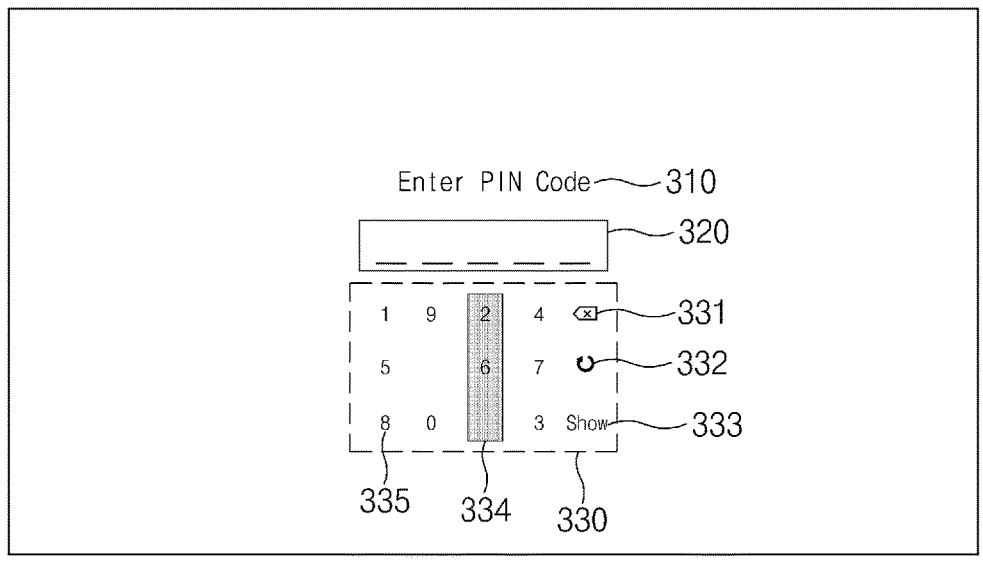
Figure 3C:
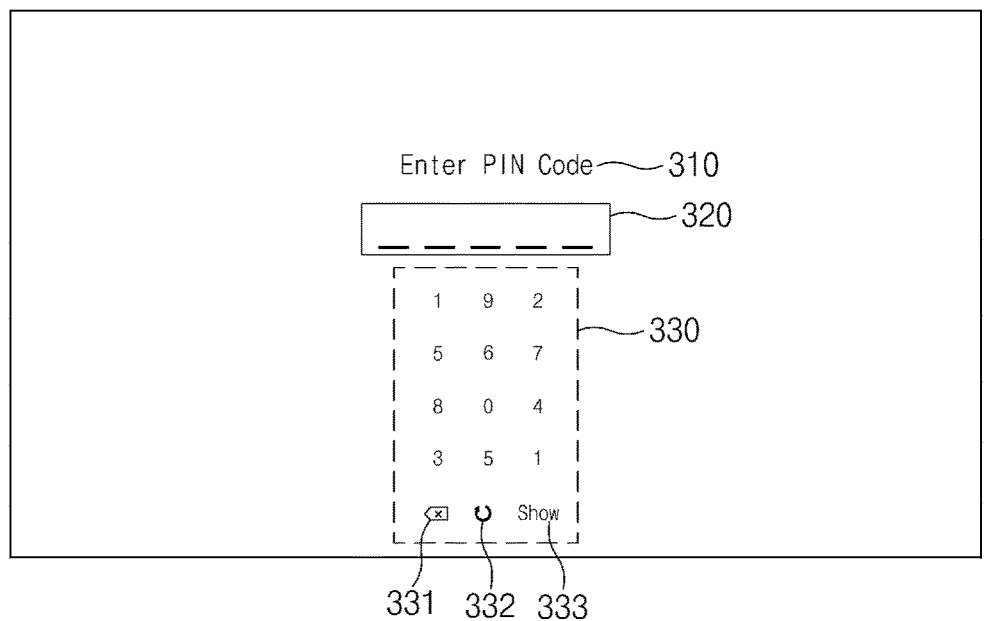

According to an embodiment, the total number of keys to be input and the total number of input keys may be displayed in the input confirmation field 320 such that the total number of keys to be input and the total number of input keys are distinguished therebetween. As illustrated in FIG. 3A, the total number of the keys to be input may be expressed by the number of blocks which are linked to each other side by side. In detail, in the case that the total number of PINs to be input is four, the input confirmation field 320 may include four blocks. As illustrated in FIG. 3A, the total number of the PINs to be input may be expressed by using alternate characters (e.g., special characters) included in the blocks. For example, in the case that the number of PINs to be input is two, two of the four blocks may be expressed by using special characters ("*"). As illustrated in FIGS. 3B and 3C, the total number of the keys to be input may be expressed by using the number of underlines in the blocks. The total number of the input keys may be expressed by using input keys or special characters displayed on the underline.

According to an embodiment, the keypad 330 may include a plurality of key objects arranged in the form of a matrix including a plurality of rows and a plurality of columns. As illustrated in FIGS. 3A and 3B, a plurality of key objects may include numeric key objects (e.g., reference number 335) and functional key objects. As illustrated in FIGS. 3A to 3B, the functional key objects may include key objects allocated to at least one of an erasing function 331, a rearrangement function 332, or a showing function 333. The rearrangement function 332 may be, for example, a function of rearranging the positions of key objects included in the keypad 330. The showing function 333 may be, for example, a function of showing input keys displayed as the alternate characters. As illustrated in FIGS. 3A to 3C, the functional key objects (e.g., reference number 331 to 333) may be arranged according to the specified rule such that the functional key objects are easily identified by a user.

Figure 3D:
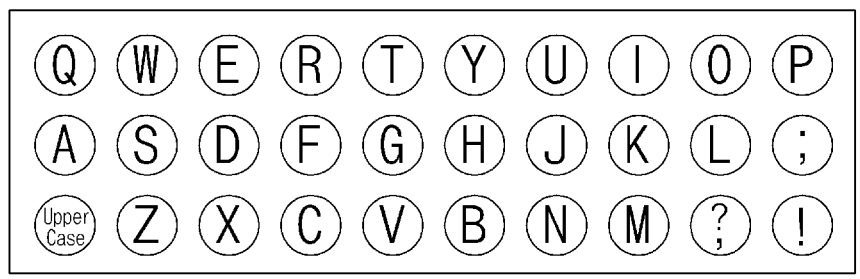

As illustrated in FIG. 3B, a plurality of key objects may include a blank key object (e.g., reference number 334). The blank key object 334 may be a key having no information, and may be a key that is not input even if the blank key object 334 is selected. The key object may include a character key object. For example, as illustrated in FIG. 3D, the keypad may be a keypad rearranged in the form of a matrix obtained by slightly modifying a QWERTY keyboard including character key objects. Alternatively, the keypad may be the combination of numeric key objects and character key objects. For example, the keypad may be a keypad obtained by arranging the keypad illustrated in FIG. 3B subsequent to the keypad illustrated in FIG. 3D.

According to an embodiment, the form highlighting and displaying the keypad 330 may be displayed corresponding to the shapes of the first and second button groups of the remote controller 10 as illustrated in FIG. 3A. In this case, according to an embodiment, a user may be supported to easily recognize buttons of the remote controller 10 to be manipulated to input a key object corresponding to a desired input. The form of highlighting the keypad 330 may be a form of applying background color to the input key objects as illustrated in FIGS. 3B and 3C.

Figure 4:
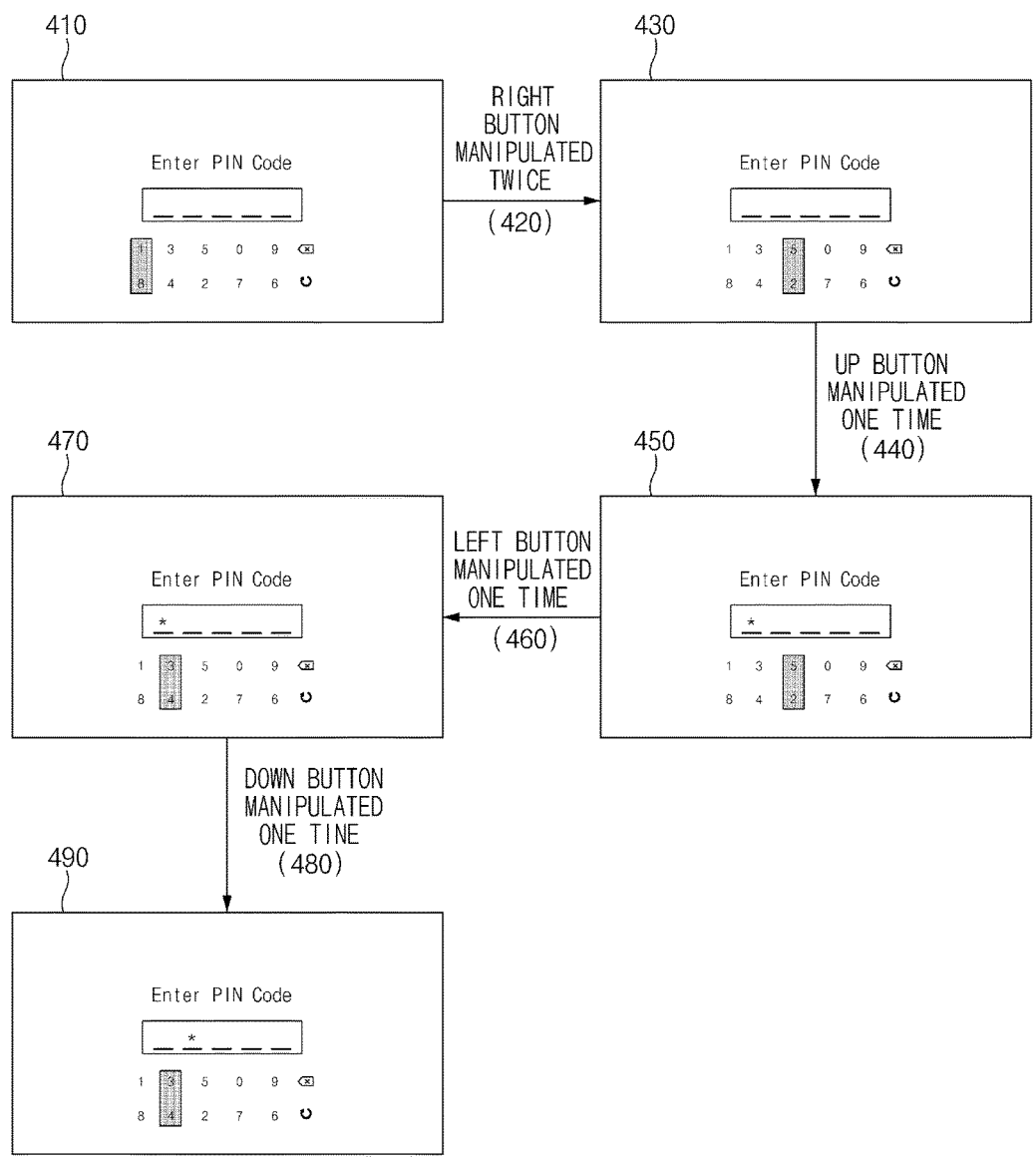
FIG. 4 is a view illustrating a display method, according to an embodiment.

FIG. 4 is a view illustrating a display method, according to an embodiment. Hereinafter, with reference to FIG. 4, description will be made regarding an example that a keypad includes a plurality of key objects arranged in the form of a 2×5 matrix, numeric key objects randomly arranged, functional key objects arranged according to a specified rule, and the total number of keys to be input is expressed by using underlines in the blocks. In the case that the key objects are arranged in the form of a 2×5 matrix, if the processor 240 recognizes the first control signal corresponding to the left button 115 and the right button 117 of the remote controller 10, the processor 240 may highlight and display the input candidate objects. In this case, if the processor 240 recognizes the second control signal corresponding to the up button 111 and the down button 113 of the remote controller 10, the processor 240 may recognize, as an input key, a key object corresponding to the second control signal among the input candidate objects.

Referring to FIG. 4, in operation 410, the processor 240 may highlight and display "1" and "8" on the first column when performing a first function. FIG. 4 illustrates that input key candidates are highlighted and displayed in the form of applying background color.

In operation 420, if a user manipulates the right button 117 of the remote controller 10 twice, the remote controller 10 may transmit a control signal including a code of the right button 117 twice. The communication unit 210 may transform the control signal from the remote controller 10 and may output the first control signal, which includes the code of the right button 117, twice.

In operation 430, the processor 240 recognizes codes of the right button 117 manipulated twice from first control signals output twice and may move the positions of key objects, which are highlighted and displayed on the keypad, rightward by two columns corresponding to the codes of the right button 117 manipulated twice. Accordingly, the processor 240 may highlight and display "5" and "2" positioned in the third column on the keypad.

In operation 440, if the user manipulates the up button 111 of the remote controller 10 one time, the remote controller 10 may transmit the second control signal including a code of the up button 111 one time. The communication unit 210 may transform the second control signal from the remote controller 10 and may output the second control signal including the code of the up button 111.

In operation 450, the processor 240 may identify the code of the up button 111 from the second control signal and may recognize the position of the key object of "5", which corresponds to the code of the up button 111, as an input key. The processor 240 may express the reception of the input key of "5" by displaying an alternate character of "*" on the input confirmation field 320 without directly expressing the input key of "5" on the screen.

In operation 460, if the user manipulates the left button 115 of the remote controller 10 one time, the remote controller 10 may transmit a first control signal including a code of the left button 115 one time. The communication unit 210 may transform the first control signal from the remote controller 10 and may output the first control signal including the code of the left button 115.

In operation 470, the processor 240 recognizes the code of the left button 115 manipulated one time from the first control signal and may move the position of key objects, which are highlighted and displayed on the keypad, leftward by one column, corresponding to the code of the left button 115 manipulated one time. Accordingly, the processor 240 may highlight and display "3" and "4" positioned in the second column on the keypad.

In operation 480, if the user manipulates the down button 113 of the remote controller 10 one time, the remote controller 10 may transmit a second control signal including a code of the down button 113 one time. The communication unit 210 may transform the second control signal from the remote controller 10 and may output the second control signal including the code of the down button 113.

In operation 490, the processor 240 may identify the code of the down button 113 from the second control signal and may recognize the position of the key object of "4", which corresponds to the code of the down button 113, as an input key. The processor 240 may express the reception of the key of "4" by displaying an alternate character of "*" on the input confirmation field 320. Thereafter, if the user does not cancel the execution of a function requiring a key input in a manner of manipulating the remote controller 10, the processor 240 may perform the display method illustrated in FIG. 4 until keys are input by the total number of input keys.

On the first screen of FIG. 4, the processor 240 may highlight and display functional keys positioned in the sixth column. If the up button 111 is input while the processor 240 highlights and displays the functional keys positioned in the sixth column, the processor 240 may cancel the input of a PIN finally input. If the user cancels the input of the PIN, the processor 240 may delete alternate characters of "*" by the number of PINs input into the input confirmation field 320. Alternatively, if the up button 111 is input while the processor 240 highlights and displays the functional keys positioned in the sixth column, the processor 240 may cancel all input PINs. In other words, the processor 240 may initialize input information on the PINs.

Figures 5C, 5D:
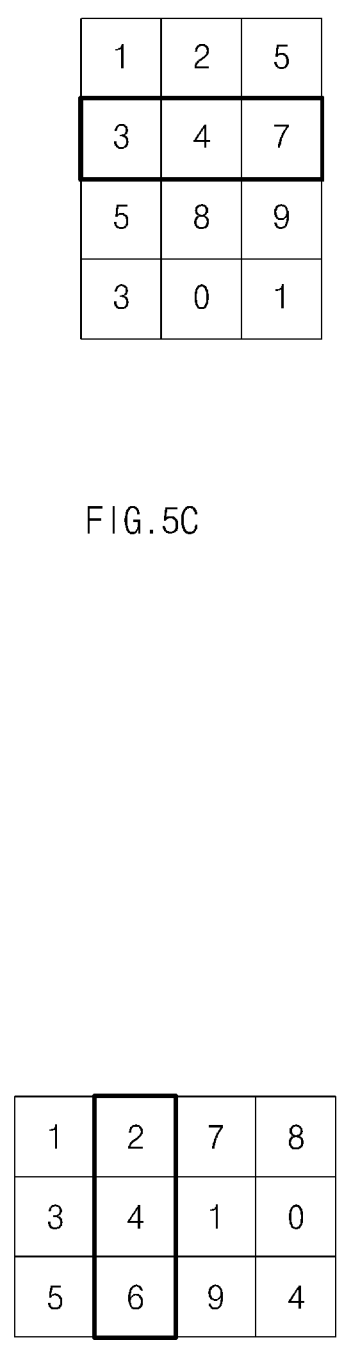

FIGS. 5A to 5D are views illustrating the relationship between the keypad and the buttons of the remote controller, according to an embodiment. FIG. 5A is a view illustrating a keypad including a key object arranged in a 2×5 matrix, according to an embodiment, FIG. 5B is a view illustrating a keypad including a key object arranged in a 5×2 matrix, according to an embodiment, FIG. 5C is a view illustrating a keypad including a key object arranged in a 3×4 matrix, according to an embodiment, and FIG. 5D is a view illustrating a keypad including a key object arranged in a 4×3 matrix, according to an embodiment. FIGS. 5A to 5D illustrate an example of highlighting input candidate objects in the form of displaying the edges of the input candidate objects with thickness thicker than those of other input candidate objects.

As illustrated in FIGS. 5A and 5B, in the case that the number of rows or columns representing shorter lengths among rows and columns in a keypad is no greater than two, the processor 240 may recognize, as a button for selecting a key object to be highlighted, a button included in the first button group corresponding to a row or a column representing a longer length in the keypad and may recognize, as a button for selecting a key object to be input, a button included in the second button group corresponding to a row or a column representing a shorter length. For example, as illustrated in FIG. 5A, when key objects are arranged in the form of a 2×5 matrix, the processor 240 may recognize, as a signal for selecting a key object to be highlighted, a first control signal corresponding to the left button 115 or the right button 117 of the remote controller 10 and may recognize, as a signal for selecting a key object to be input, a second control signal corresponding to the up button 111 or the right button 117 of the remote controller 10. For example, as illustrated in FIG. 5B, when key objects are arranged in the form of a 5×2 matrix, the processor 240 may recognize, as a signal for selecting a key object to be highlighted, a first control signal corresponding to the up button 111 or the down button 113 of the remote controller 10 and may recognize, as a signal for selecting a key object to be input, a second control signal corresponding to the left button 115 or the right button 117 of the remote controller 10. As illustrated in FIG. 5B, in the state that key objects of "5" and "6" are highlighted, the processor 240 may recognize the key object of "5" as an input key if receiving the second control signal corresponding to the left button 115 of the remote controller 10 and may recognize the key object of "6" as the input key if receiving the second control signal corresponding to the right button 117 of the remote controller 10. As described above, according to an embodiment, as the direction of moving the position of the key highlighted by using a highlighting key and the direction of arranging the highlighting key are unified, a user may be supported such that the user intuitively recognize a highlighting key and an input key among a plurality of buttons.

Referring to FIGS. 5C and 5D, if rows or columns having shorter lengths is having the length of '3' among rows and columns of key objects forming a keypad, the second button group for selecting an input key among input candidate objects may include three buttons. As illustrated in FIGS. 5C and 5D, if the total number of elements included in the matrix of the keypad exceeds the number of information (e.g., numbers) expressed by the key objects, the keypad may repeatedly include the key objects.

As illustrated in FIG. 5C, in the case that columns represent a longer length among rows and columns of the keypad, a first button group may include the up button 111 and the down button 113 providing a moving function in the column direction and a second button group may include the left button 115, the OK button 120, and the right button 117 providing a moving function in the row direction. In FIG. 5C, the processor 240 may change key objects to be highlighted in response to control signals corresponding to the up button 111 and the down button 113. The processor 240 may recognize an input key among the highlighted key objects in response to second control signals corresponding to the left button 115, the OK button 120, and the right button 117. For example, in the state that the key objects of "3", "4", and "7" are highlighted and displayed, the processor 240 may recognize a number of "3" corresponding to the key object of "3" as the input key if receiving the second control signal corresponding to the left button 115 of the remote controller 10, may recognize a number of "4" corresponding to the key object of "4" as the input key if receiving the second control signal corresponding to the OK button 120 of the remote controller 10, and may recognize a number of "7" corresponding to a key object of "7" as the input key if receiving the second control signal corresponding to the right button 117.

As illustrated in FIG. 5D, in the case that rows represent a longer length among rows and columns of a keypad, the first button group may include the left button 115 and the right button 117 providing a moving function in the row direction and a second button group may include the up button 111, the OK button 120, and the down button 113 providing a moving function in the column direction. For example, in the state that the key objects of "2", "4", and "6" are highlighted, the processor 240 may recognize a number of "2" corresponding to the key object of "2" as the input key if receiving a second control signal corresponding to the up button 111 of the remote controller 10, may recognize a number of "4" corresponding to the key object of "4" as the input key if receiving a second control signal corresponding to the OK button 120 of the remote controller 10, and may recognize a number of "6" corresponding to a key object of "6" as the input key if receiving the second control signal corresponding to the down button 113.

According to the above-described embodiments, description has been made regarding examples of manipulating the keypad displayed on the display device 20 by using at least four buttons or at most five buttons of the remote controller 10. Therefore, the description has been made regarding an example that the number of rows or columns representing a shorter length does not exceed "3" on the keypad having key objects arranged in the form of a matrix. However, in the case that the keypad displayed on the display device 20 is manipulated by using more than five buttons of the remote controller 10, the number of rows and columns of the keypad is not limited to "3".

Figure 6:
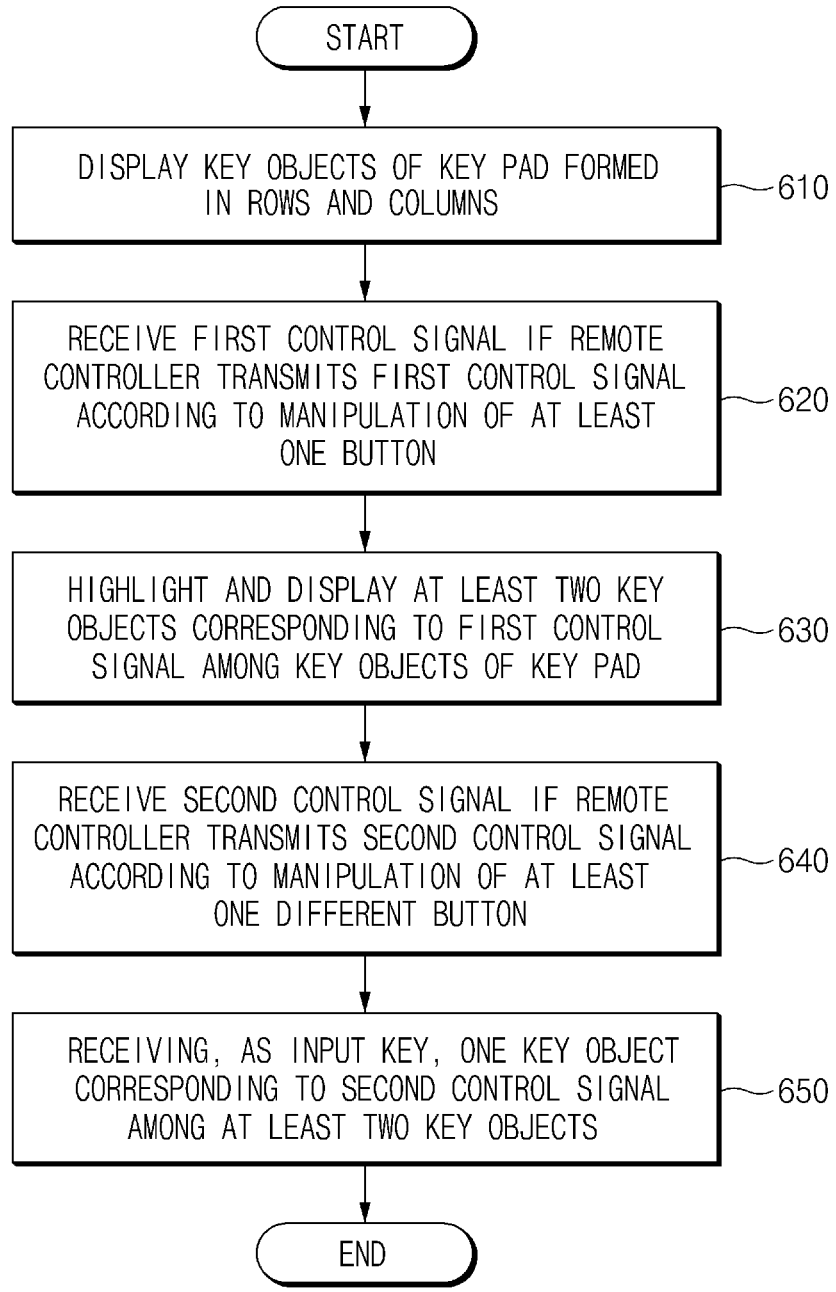
FIG. 6 is a flowchart illustrating a display method, according to an embodiment.

FIG. 6 is a flowchart illustrating a display method, according to an embodiment.

Referring to FIG. 6, in operation 610, the processor 240 may display key objects of a keypad, which includes a plurality of rows and columns, on a display.

In operation 620, the processor 240 may receive a first control signal if a remote controller transmits the first control signal according to the manipulation of the at least one button.

In operation 630, the processor 240 may highlight and display at least two key objects corresponding to the first control signal among the key objects of the keypad.

In operation 640, the processor 240 may receive a second control signal if the remote controller transmits the second control signal according to the manipulation of at least one different button.

In operation 650, the processor 240 may recognize, as an input key, one key object, which corresponds to the second control signal, of the at least two key objects According to an embodiment, a display device includes a display; a communication unit configured to communicate with a remote controller, wherein the remote controller includes a first button group and a second button group, the first button group includes at least one button, and the second button group includes at least one different button; and a processor configured to output a keypad on the display, wherein the keypad includes a plurality of key objects formed in a plurality of rows and a plurality of columns, wherein the processor is configured to receive a signal from the remote controller through the communication unit; highlight and display at least two key objects on the keypad, if receiving a first control signal according to manipulation of the at least one button from the remote controller; and recognize, as an input key, one key object, which corresponds to a second control signal according to manipulation of the at least one different button, among the at least two key objects, if receiving the second control signal from the remote controller.

The first button group includes a first button and a second button; wherein the second button group includes a third button and a fourth button; wherein the first button is a button allocated to a moving function in a first direction; wherein the second button is a button allocated to a moving function in a second direction opposite to the first direction; wherein the third button is a button allocated to a moving function in a third direction perpendicular to the first and second directions; and wherein the fourth button is a button allocated to a moving function in a fourth direction opposite to the third direction.

The first direction or the second direction is an arrangement direction of a row or a column representing a longer length among rows and columns of the keypad; and wherein the third direction or the fourth direction is an arrangement direction of a row or a column representing a shorter length among the rows and the columns of the keypad.

The number of the at least one different button included in the second button group is set to correspond to the number of plurality of key objects included in the row or the column representing the shorter length.

The plurality of key objects includes at least one of a numeric key object, a character key object, or a sign key object. The plurality of key objects is set to be randomly arranged.

The plurality of key object include a blank key object, which is not recognized as the input key, even if the blank key object is the one key object corresponding to the second control signal.

At least some of the plurality of key objects is set to be repeatedly displayed.

The processor is configured to highlight and display key objects, which are included in one row or one column corresponding to the first control signal, among the key objects formed in the rows and the columns.

Wherein the processor is configured to highlight the key objects, which are included in the one row or the one column, by making the key objects different from another key object with respect to at least one of a size, a color, a thickness, an edge, or a background color.

According to an embodiment, the processor is configured to highlight the key objects, which are included in the one row or the one column, in a shape corresponding to shapes of the first and second button groups.

The processor is configured to display a specified object different from the input key if recognizing the input key.

The keypad further includes a functional key object allocated to a rearranging function, and wherein the processor is configured to rearrange and display the plurality of key objects included in the keypad if the recognized input key represents the functional key object.

According to an embodiment, a display method of a display device communicating with a remote controller, wherein the remote controller includes a first button group and a second button group, the first button group includes at least one button, and the second button group includes at least one different button, the display method includes displaying a plurality of key objects of a keypad, which are formed in a plurality of rows and a plurality of columns, on a display; receiving a first control signal according to manipulation of the at least one button if the remote controller transmits the first control signal; highlighting and displaying at least two key objects corresponding to the first control signal among the plurality of key objects of the keypad; receiving a second control signal according to manipulation of the at least one different button if the remote controller transmits the second control signal; and recognizing, as an input key, one key object, which corresponds to the second control signal, among the at least two key objects.

The plurality of key objects includes at least one of a numeric key object, a character key object, or a sign key object.

The plurality of key objects is set to be randomly arranged.

The highlighting and displaying of the at least two key objects includes selecting key objects, which are included in one row or one column corresponding to the first control signal, among the plurality of key objects formed in the rows and the columns; and highlighting the key objects, which are included in the one row or the one column, by making the key objects different from another key object with respect to at least one of a size, a color, a thickness, an edge, or a background color.

The highlighting and displaying of the at least two key objects includes selecting key objects, which are included in one row or one column corresponding to the first control signal, among the plurality of key objects formed in the rows and the columns; and highlighting the key objects, which are included in the one row or the one column, in a shape corresponding to shapes of the first and second button groups.

The display method may further include displaying a specified object different from the input key if recognizing the input key.

According to an embodiment, a computer-readable storage medium having a program for executing a method includes if a remote controller, which includes a first button group including at least one button and a second button group including at least one different button, transmits a first control signal according to manipulation of the at least one button, receiving the first control signal; highlighting and displaying at least two key objects corresponding to the first control signal among key objects of a keypad, which are formed in a plurality of rows and a plurality of rows; receiving a second control signal according to manipulation of the at least one different button if the remote controller transmits the second control signal; and recognizing, as an input key, one key object corresponding to the second control signal among the at least two key objects.

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 240, may cause the one or more processors to perform a function corresponding to the instruction. The computer-readable storage media, for example, may be the memory 220.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display device comprising:
   a display;
   a communication device configured to communicate with a remote controller, wherein the remote controller includes a first button to which a moving function in a left direction on the display is allocated, a second button to which a moving function in a right direction on the display is allocated, a third button to which a moving function in a upper direction on the display is allocated, and a fourth button to which a moving function in a downward direction on the display is allocated; and
   a processor configured to output information representative of a keypad on the display, wherein the information representative of the keypad includes a plurality of key objects formed in two rows and a plurality of columns, wherein the processor is configured to:
   highlight a column among the plurality of columns in response to receiving a first control signal for manipulating at least one of the first button and the second button from the remote controller, and
   select a key object in the highlighted column in response to receiving a second control signal for manipulating at least one of the third button and the fourth button from the remote controller.

2. The display device of claim 1, wherein the left direction or the right direction is an arrangement direction of a row or a column representing a longer length among the two rows and the plurality of columns of the keypad output on the display; and
   wherein the upper direction or the downward direction is an arrangement direction of a row or a column representing a shorter length among the two rows and the plurality of columns of the keypad.

3. The display device of claim 1, wherein the plurality of key objects include at least one of a numeric key object, a character key object, or a sign key object.

4. The display device of claim 1, wherein the plurality of key objects are set to be randomly arranged.

5. The display device of claim 1, wherein the plurality of key objects include a blank key object, which is unrecognized as an input key, even when a blank key object is the key object corresponding to the second control signal.

6. The display device of claim 1, wherein at least some of the plurality of key objects are set to be repeatedly displayed.

7. The display device of claim 1, wherein the processor is configured to:
 highlight and display key objects, which are included in one row or one column corresponding to the first control signal, among the plurality of key objects formed in the two rows and the plurality of columns of the keypad.

8. The display device of claim 7, wherein the processor is configured to:
 highlight the key objects, which are included in the one row or the one column, by making the key objects different from another key object with respect to at least one of a size, a color, a thickness, an edge, or a background color.

9. The display device of claim 7, wherein the processor is configured to:
 highlight the key objects, which are included in the one row or the one column, in a shape corresponding to shapes of the first button, the second button, the third button and the fourth button.

10. The display device of claim 1, wherein the processor is configured to:
 display a specified object different from the selected key object.

11. The display device of claim 1, wherein the keypad further includes a functional key object allocated to a rearranging function, and
 wherein the processor is configured to:
  rearrange and display the plurality of key objects included in the keypad when the selected key object represents the functional key object.

12. A display method of a display device communicating with a remote controller which includes a first button to which a moving function in a left direction on a display is allocated, a second button to which a moving function in a right direction on the display is allocated, a third button to which a moving function in a upper direction on the display is allocated, and a fourth button to which a moving function in a downward direction on the display is allocated, the display method comprising:
 displaying a plurality of key objects of a keypad, which are formed in two rows and a plurality of columns, on a display;
 receiving a first control signal for manipulating at least one of the first button and the second button from the remote controller;
 highlighting a column among the plurality of columns in response to receiving the first control signal;
 receiving a second control signal for manipulating at least one of the third button and the fourth button from the remote controller; and
 selecting a key object in the highlighted column in response to receiving the second control signal.

13. The display method of claim 12, wherein the plurality of key objects include at least one of a numeric key object, a character key object, or a sign key object.

14. The display method of claim 12, wherein the plurality of key objects are set to be randomly arranged.

15. The display method of claim 12, wherein the highlighting a column among the plurality of columns in response to receiving the first control signal includes:
 selecting key objects, which are included in one row or one column corresponding to the first control signal, among the plurality of key objects formed in the two rows and the plurality of columns of the keypad; and
 highlighting the key objects that are selected in the selecting, which are included in the one row or the one column, by making the key objects different from another key object with respect to at least one of a size, a color, a thickness, an edge, or a background color.

16. The display method of claim 12, wherein the highlighting a column among the plurality of columns in response to receiving the first control signal includes:
 identifying the at least two key objects selected, which are included in the one row or the one column corresponding to the first control signal, among the plurality of key objects formed in the two rows and the plurality of columns of the keypad; and
 highlighting the at least two key objects, which are included in the one row or the one column, in a shape corresponding to shapes of the first button, the second button, the third button, and the fourth button.

17. The display method of claim 12, further comprising:
 displaying a specified object different from the selected key object.

18. A non-transitory computer-readable storage medium having a program for executing a method comprising:
 displaying a plurality of key objects of a keypad, which are formed in two rows and a plurality of columns, on a display;
 receiving, when a remote controller which includes a first button to which a moving function in a left direction on a display is allocated, a second button to which a moving function in a right direction on the display is allocated, a third button to which a moving function in a upper direction on the display is allocated, and a fourth button to which a moving function in a downward direction on the display is allocated, a first control signal for manipulating at least one of the first button and the second button from the remote controller,
 highlighting a column among the plurality of columns in response to receiving the first control signal;
 receiving a second control signal for manipulating at least one of the third button and the forth button from the remote controller; and
 selecting a key object in the highlighted column in response to receiving the second control signal.

* * * * *